(12) United States Patent
Buer (10) Patent No.: US 8,762,742 B2
(45) Date of Patent: Jun. 24, 2014

(54) SECURITY ARCHITECTURE FOR USING HOST MEMORY IN THE DESIGN OF A SECURE ELEMENT

(75) Inventor: Mark Buer, Payson, AZ (US)

(73) Assignee: Broadcom Corporation, Irvine, CA (US)

( * ) Notice: Subject to any disclaimer, the term of this patent is extended or adjusted under 35 U.S.C. 154(b) by 141 days.

(21) Appl. No.: 13/173,931

(22) Filed: Jun. 30, 2011

(65) Prior Publication Data

US 2012/0297204 A1 Nov. 22, 2012

Related U.S. Application Data

(60) Provisional application No. 61/486,625, filed on May 16, 2011.

(51) Int. Cl.
*H04L 29/06* (2006.01)

(52) U.S. Cl.
USPC .......................................................... 713/193

(58) Field of Classification Search
USPC .............................. 726/30; 713/153, 154, 193
See application file for complete search history.

(56) References Cited

U.S. PATENT DOCUMENTS

| | | | |
|---|---|---|---|
| 2005/0086465 A1* | 4/2005 | Sapkota et al. | 713/150 |
| 2008/0063204 A1* | 3/2008 | Braskich et al. | 380/270 |
| 2009/0057421 A1* | 3/2009 | Suorsa et al. | 235/494 |
| 2010/0037065 A1 | 2/2010 | Dayka et al. | |
| 2011/0078081 A1 | 3/2011 | Pirzadeh et al. | |
| 2012/0102513 A1* | 4/2012 | Franchi et al. | 725/14 |
| 2012/0178366 A1* | 7/2012 | Levy et al. | 455/41.1 |
| 2012/0190354 A1* | 7/2012 | Merrien et al. | 455/422.1 |
| 2012/0260086 A1* | 10/2012 | Haggerty et al. | 713/150 |
| 2013/0019323 A1* | 1/2013 | Arvidsson et al. | 726/30 |

FOREIGN PATENT DOCUMENTS

WO    WO 2010/127679 A1    11/2010

OTHER PUBLICATIONS

"EMV Mobile Contactless Payment: Technical Issues and Position Paper," Version 1.0, accessed at World Wide Web emvco.com/mobile.aspx, accessed on Apr. 20, 2009, 37 pages (Oct. 2007).
European Search Report for European Application No. EP 12 00 3734, Munich, Germany, mailed on Sep. 12, 2012.
"Security of Proximity Mobile Payments," A Smart Card Alliance Contactless and Mobile Payments Council White Paper, United States, 39 pages (May 2009).
Van Dijk, et al., "Securing Shared Untrusted Storage by using TPM 1.2 Without Requiring a Trusted OS," accessed at World Wide Web csg.csail.mit.edu/pubs/memos/Memo-498/memo498.pdf, accessed on Aug. 20, 2010, 24 pages (May 2007).

* cited by examiner

(Continued)

*Primary Examiner* — Michael S McNally
(74) *Attorney, Agent, or Firm* — Sterne, Kessler, Goldstein & Fox P.L.L.C.

(57) ABSTRACT

Embodiments of a security architecture for securely storing applications, such as Near Field Communication (NFC) applications, in host memory of a mobile device are provided. The mobile device includes a host application processor, a non-volatile memory, a NFC controller, and an embedded Secure Element (eSE). The eSE is configured to encrypt code and state data associated with a NFC application; store the code and the state data, after having been encrypted, in the non-volatile memory as a binary large object (blob); load the blob from the non-volatile memory in response to an action performed by the host application processor or the NFC controller; decrypt and authenticate the code and the state data; and execute the code to exchange data with a contactless communication device via the NFC controller. The non-volatile memory is external to the eSE.

19 Claims, 8 Drawing Sheets

SECURITY ARCHITECTURE FOR USING HOST MEMORY IN THE DESIGN OF A SECURE ELEMENT

CROSS REFERENCE TO RELATED APPLICATIONS

This application claims the benefit of U.S. Provisional Patent Application No. 61/486,625, filed May 16, 2011, which is incorporated herein by reference in its entirety.

FIELD OF THE INVENTION

This application relates generally to a security architecture and, more particularly, to security of Near Field Communication applications.

BACKGROUND

Near Field Communication (NFC) is a wireless communication technology that permits data to be exchanged between two devices that are up to ten centimeters apart. In the near future, NFC-enabled mobile devices are expected to become ubiquitous. These NFC-enabled devices can act both as a contactless card and reader, providing the capability to perform payment, loyalty, ticketing, and access control applications, to name a few. In general, there will be no need for an owner of a NFC-enabled mobile device to carry a credit card, bus ticket, or access card. The owner's mobile device will function as an "e-wallet" containing virtual implementations of these cards and tickets, as well as others.

The main application processor of a mobile device, commonly referred to as the host application processor, can be used to execute a wide variety of different NFC applications. These NFC applications and associated data can be stored in the host non-volatile memory of the mobile device and fetched when execution is requested or desired. During execution of a NFC application, the host application processor can use a NFC controller in the mobile device to exchange data and commands with a remote NFC-enabled device that is within close proximity. The exchange of data can be performed to carry out a function of the NFC application.

Because NFC-based applications can be executed in the host application processor and stored in the host non-volatile memory of the mobile device, these NFC applications are vulnerable to attack. The host non-volatile memory of the mobile device is generally unsecure and is not protected against unintentional deletion or intentional manipulation of the data stored therein. For security-insensitive applications (e.g., applications for reading and displaying smart label data on a poster), the lack of security is not an issue. However, for applications such as payment, ticketing, and loyalty applications, any unintended deletion, reading, or change of the code or data associated with these applications can have undesirable consequences, including theft of monetary funds and fraud.

The conventional solution to this problem has been the further inclusion of a Secure Element (SE) in the NFC-enabled mobile device. A SE is a tamper resistant device with an embedded microprocessor. There are three common architectures for implementing a SE: the first architecture implements the SE as an independent, embedded hardware module built into the mobile device; the second architecture implements the SE in a Subscriber Identity Module (SIM); and the third architecture implements the SE in a removable User Identity Module (UIM) or Universal Integrated Circuit Card (UICC). A SE implemented in accordance with the first architecture is often referred to as an embedded SE (eSE).

Conventional NFC-enabled mobile devices that include an eSE store and execute security-sensitive NFC applications and associated data in the eSE. More specifically, the security-sensitive NFC applications are stored in non-volatile memory in the eSE to provide protection. The integrated, non-volatile memory of the eSE, which can be, for example, flash or EEPROM, typically does not scale with process, however. Thus, eSEs with integrated non-volatile memory are often implemented in older, less ideal processes. For example, a state of the art eSE with integrated non-volatile memory may be manufactured using a 90 nm process as opposed to being manufactured with an available 40 nm process because of the scalability issues associated with integrated, non-volatile memory.

In addition to the above noted issue, as NFC-enabled mobile devices become more ubiquitous, the number of NFC applications available and desired to be securely stored and executed in a mobile device is expected to grow. As a result, the integrated non-volatile memory in the eSE has to be large enough to accommodate a potentially large number of NFC applications.

Therefore, what is needed is a security architecture that supports an eSE capable of scaling with process, while still providing for the secure execution and storage of a large number of NFC applications.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, embodiments of the present invention will be described with respect to a NFC-enabled mobile device (e.g., a mobile phone) configured to communicate over one or more cellular and/or wireless communication networks. It will be appreciated, however, that embodiments of the present invention are not limited to mobile devices and are widely applicable to other NFC-enabled devices, such as personal computers, laptops, personal digital assistants (PDAs), and personal entertainment devices, to name a few.

Figure 1:
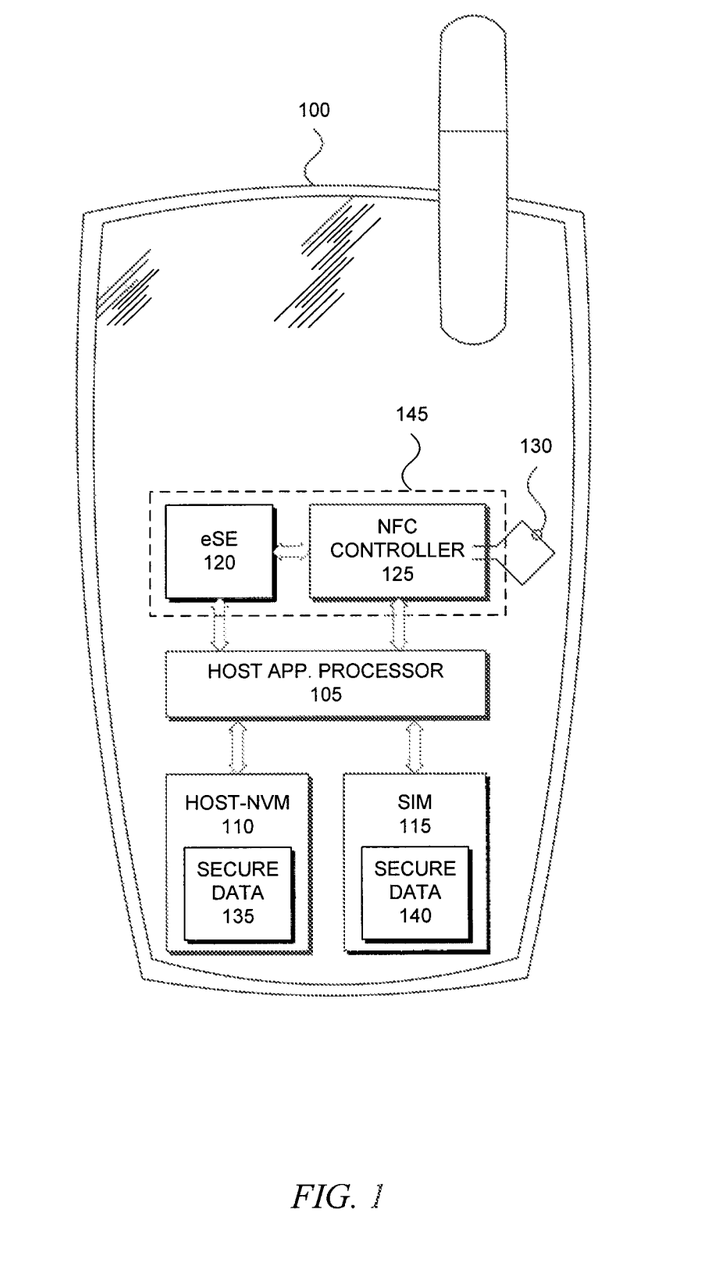
FIG. 1 illustrates a block diagram of a security architecture for securely storing NFC applications in host memory of a mobile device, according to embodiments of the present invention.

FIG. 1 illustrates a block diagram of a security architecture for securely storing applications and associated data in the host memory of a mobile device 100, according to embodiments of the present invention. Mobile device 100 includes a host application processor 105, a host non-volatile memory 110, an optional Subscriber Identity Module (SIM) 115, an embedded Secure Element (eSE) 120, and a NFC controller 125 coupled to an antenna 130. In an embodiment, antenna 130 is a loop antenna.

In operation, host application processor 105 is configured to execute an operating system of mobile device 100, which can be stored within host non-volatile memory 110. The operating system can support a user interface and the execution of additional applications, such as security-insensitive NFC applications, on host application processor 105. Host application processor 105 can further be configured to control, at least in part, communication capabilities of the mobile device used to exchange voice and/or data over a cellular network operated by a mobile network operator.

Host non-volatile memory 110 is coupled to host application processor 105 and is configured to provide long-term, persistent storage of applications and associated data even when mobile device 100 is not powered. Host non-volatile memory 110 can include one or more of read-only memory (ROM), electrically erasable programmable ROM (EEPROM), and flash memory, to name a few. Besides providing possible storage for the operating system of mobile device 100, host non-volatile memory 110 can further be used to store various additional applications and associated data for execution by host application processor 105 and, as will be explained further below, secure data 135 on behalf of eSE 120. Secure data 135 can include code and data associated with security-sensitive applications, such as payment, loyalty, and ticketing-based NEC applications.

As further illustrated in FIG. 1, mobile device 100 further includes a NEC controller 125 that is configured to transmit data to and receive data from a remote NEC-enabled device in accordance with applicable standards, including but not limited to the ECMA-340 standard and/or the ISO/IEC 18092 standard. These standards determine the "contactless" operating environment of NEC-enabled devices, the format of data to be transferred, and data rates for the transfer.

NEC controller 125 can be configured to communicate with a remote NEC-enabled device (not shown) via magnetic field induction using antenna 130. NEC controller 125 can communicate with the remote NEC-enabled device when the remote device is brought within close proximity to antenna 130 (typically within four centimeters). The communications can be performed to carry out a contactless transaction, such as a payment, ticketing, or loyalty transaction, or to access informational content, for example.

Also included within mobile device 100 is eSE 120, eSE 120 is a tamper resistant, integrated circuit device with an embedded microprocessor. In an embodiment, eSE 120 is implemented as an independent, embedded hardware module built into mobile device 100 and is configured to provide a secure environment for the execution of security-sensitive applications and, in particular, security-sensitive NEC applications. eSE 120 provides a secure execution environment for security-sensitive NEC applications by employing logical security techniques (e.g., cryptographic measures) and, possibly, physical security techniques to control access to the device and the data it operates on. For example, physical techniques can include the encapsulation of eSE 120 in an epoxy, and logical security techniques can include one or more of encryption, decryption, signing, and authentication.

eSEs in prior NFC-enabled mobile devices generally included integrated, non-volatile memory for storing security-sensitive applications and associated data to ensure their protection. However, integrated, non-volatile memory does not scale with process. As a result, eSEs in prior NFC-enabled mobile devices were often implemented using older, less ideal processes.

Unlike these prior eSE implementations, eSE 120 does not include (non-scalable) integrated non-volatile memory for storing security-sensitive applications. Therefore, eSE 120 can be manufactured using process technologies previously excluded by the scalability issues associated with this memory. In addition, the removal of the (non-scalable) integrated non-volatile memory for storing security-sensitive applications from the eSE more readily opens up the potential for eSE 120 to be manufactured on a single die 145 with NFC controller 125.

The novel security architecture of mobile device 100, illustrated in FIG. 1, enables eSE 120 to be implemented without (non-scalable) integrated non-volatile memory for storing security-sensitive applications, while at the same time still providing for the secure execution and storage of a large number of NFC applications. More specifically, eSE 120 is configured to securely store security-sensitive applications, such as NFC applications and associated data, in host non-volatile memory 110 as secure data 135. Details of how eSE 120 performs this secure storage are described below in further reference to FIG. 2.

Figure 2:
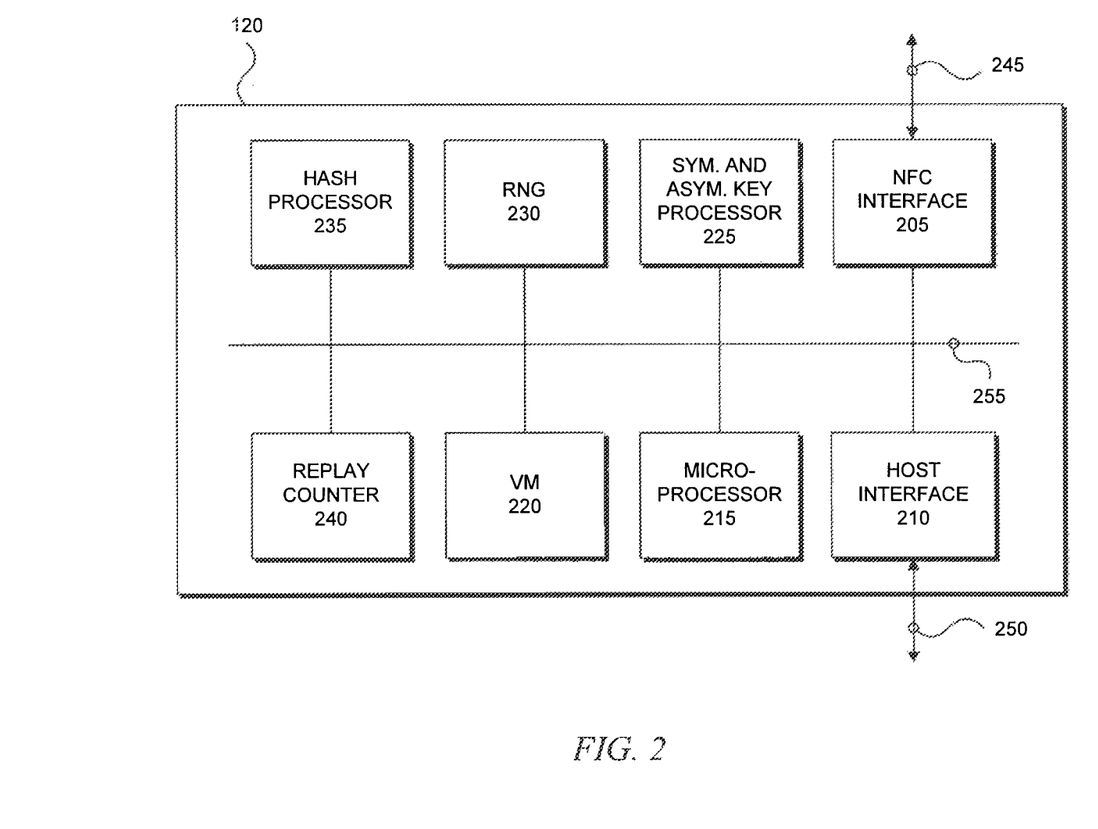
FIG. 2 illustrates a block diagram of an eSE, without integrated non-volatile memory for storing NSF applications, that is configured to operate in the security architecture illustrated in FIG. 1, according to embodiments of the present invention.

FIG. 2 illustrates one potential block diagram implementation of eSE 120, according to embodiments of the present invention. As illustrated in FIG. 2, eSE 120 does not include (non-scalable) integrated, non-volatile memory for storing security-sensitive applications. Rather, eSE 120 includes a NFC interface 205, a host interface 210, a microprocessor 215, a volatile memory 220, a symmetric and asymmetric key processor 225, a random number generator (RNG) 230, a hash processor 235, and a replay counter 240. In one embodiment, a bus 255 communicatively couples these components of eSE 120 together.

In operation, microprocessor 215 is configured to execute security-sensitive applications, such as security-sensitive NFC applications. In one embodiment, microprocessor 215 is configured to execute security-sensitive applications in a runtime environment specified by the GlobalPlatform and/or Java Card specifications. NFC applications executed by microprocessor 215 can exchange data and commands 245 with a remote NFC-enabled device via NFC interface 205, which is coupled to NFC controller 125 illustrated in FIG. 1. In addition, NFC applications (and other applications) executed by microprocessor 215 can further exchange data and commands 250 with host application processor 105 via host interface 210.

Security-sensitive applications and associated data can be encrypted by eSE 120 and stored in host non-volatile memory 110, illustrated in FIG. 1. In one embodiment, eSE 120 can use RNG 230 to generate random numbers for constructing one or more asymmetric or symmetric cryptographic keys. These constructed keys can then be used to encrypt the security-sensitive applications and associated data for storage in host non-volatile memory 110.

eSE 120 can use symmetric and asymmetric key processor 220 to perform encryption of the security-sensitive applications and associated data. Symmetric and asymmetric key processor 220 is configured to support both symmetric cryptographic algorithms, such as AES and DES, and asymmetric (i.e., public) cryptographic algorithms, such as RSA and DSA. Symmetric and asymmetric key processor 220 can use the one or more cryptographic keys generated, at least in part, using RNG 230 in combination with the one or more cryptographic algorithms it supports to encrypt the security-sensitive applications and associated data. Alternatively, symmetric and asymmetric key processor 220 can use one or more endorsement keys or other keys that are unique to eSE 120 or the user/owner of mobile device 100 in combination with the one or more cryptographic algorithms it supports to encrypt the security-sensitive applications and associated data. In one embodiment, the key(s) used to encrypt the security-sensitive applications and associated data are confined to eSE 120 (i.e., they cannot be removed from eSE 120). In another embodiment, the key(s) used to encrypt the security-sensitive applications and associated data are portable and can be transferred to another SE, for example.

Once encrypted by eSE 120, the security-sensitive applications and associated data can be stored in host non-volatile memory 110 as secure data 135. In an embodiment, an encrypted, security-sensitive application (and associated data) is stored in host non-volatile memory 110 as a binary large object (blob). eSE 120 can pass the encrypted data to host non-volatile memory 110 through host application processor 105. In a further embodiment, the process of passing an encrypted, security-sensitive application and associated data to and from host non-volatile memory 110 is handled by memory managers running on both eSE 120 and host application processor 105. These memory managers can function to make host non-volatile memory 110 appear as if it is directly coupled and accessible to eSE 120. In other words, host non-volatile memory 110 can be directly addressed by eSE 120 using the memory managers.

In another embodiment, eSE 120 can alternatively store encrypted, security-sensitive applications and associated data in a Subscriber Identity Module (SIM) 115, further illustrated in FIG. 1, as secure data 140. eSE 120 can access SIM 115 through host application processor 105 and/or through a direct connection (not shown). In an embodiment, an encrypted, security-sensitive application (and associated data) is stored in SIM 115 as a blob.

eSE 120 can further use hash processor 235 to produce a cryptographic hash (e.g., digital signature or message authentication code (MAC)) of a security-sensitive application and/or associated data. Specifically, hash processor 235 can be configured to perform one or more hash algorithms, any of which can be used by eSE 120 to generate the hash. For example, hash processor 235 can perform one or more of the following hash algorithms: MD5, RIPEMD-160, SHA-1, SHA-256, SHA-384, and SHA-512, to name a few. The cryptographic hash produced can later be used by eSE 120 to authenticate the integrity of a security-sensitive application and/or associated data after having been loaded from host non-volatile memory 110 and decrypted. The cryptographic hash for a security-sensitive application and/or associated data can be stored in host non-volatile memory 110 together with the encrypted, security-sensitive application and/or associated data. In an embodiment, the cryptographic hash of an encrypted, security-sensitive application and associated data can be stored in host non-volatile memory 110 together with the encrypted, security-sensitive application and associated data as a blob.

Volatile memory 220 of eSE 120 is configured to store encrypted, security-sensitive applications and/or associated data loaded from host non-volatile memory 110. Encrypted, security-sensitive applications and/or associated data can be loaded from host non-volatile memory and stored in volatile memory 220 of eSE 120 in response to an action by host application processor 105 or NFC controller 125. For example, an application executing on host application processor 105 may request or require the execution of one or more security-sensitive applications. In another example, NFC controller 125 may request or require a security-sensitive NFC application to be executed. Upon these requests and other actions by host application processor 105 and/or NFC controller 125, eSE 120 can load one or more encrypted, security-sensitive applications and/or associated data from host non-volatile memory 110.

Once stored in volatile memory 220, the encrypted, security-sensitive applications and/or associated data can be decrypted and authenticated by eSE 120. eSE 120 can perform authentication using hash processor 235. More specifically, eSE 120 can use the cryptographic hash stored with and corresponding to the encrypted, security-sensitive application and/or associated data loaded from non-volatile memory 110 to perform authentication.

Although eSE 120, through the use of encryption and hashing, can prevent and detect alterations made to a security-sensitive application and/or associated data stored in host non-volatile memory 110, these security mechanisms generally cannot detect or prevent replay attacks of the associated data of the security-sensitive application. A replay attack is an attack in which valid data is repeated. A replay attack is typically perpetrated by intercepting valid data then fraudulently reusing the data in subsequent transactions.

For example, for a NFC-based payment application that is configured to allow a credit issuer to store a credit balance on a user's mobile device as associated data, encrypting and cryptographically hashing the associated data can be used to prevent and detect unauthorized changes to the stored credit balance. However, these security mechanisms cannot prevent an attacker from intercepting and replaying this stored balance in a subsequent transaction. That is, even if the credit balance is signed, an attacker can still copy an old version of this signed credit balance and reuse the copy to make a future purchase. If the credit balance is not stored on a central server, or if a merchant does not have contact with the central server where the credit balance is stored, the merchant will assume the credit balance is authentic. However, the merchant will have no way of telling if the balance is fresh (i.e., not an old copy).

To prevent such a replay attack from occurring, eSE 120 further includes replay counter 240. In an embodiment, replay counter 240 is a monotonic counter that can be used to detect, and therefore prevent, replay attacks. Because replay counter 240 is stored in the secure environment of eSE 120, the monotonic count value maintained by replay counter 240 can be trusted by third parties, such as credit issuers and merchants.

eSE 120 specifically uses replay counter 240 to protect dedicated, monotonic count values for one or more security-sensitive applications executed by eSE 120 that require and/or request a replay counter. The dedicated count values for the one or more security-sensitive applications are bundled together, encrypted and signed, and then stored in host non-volatile memory 110 by eSE 120. In one embodiment, the encrypted and signed bundle of dedicated, monotonic count values is stored in host non-volatile memory 110 as a blob.

Each time the associated data of a security-sensitive application is updated or is changed, the dedicated count value for that particular application is incremented within the bundle and the value of replay counter 240 is further incremented. Once incremented, a copy of the current count value of replay counter 240 is included in the bundle of dedicated, monotonic count values and then that bundle is encrypted and signed. When a security-sensitive application attempts to use its associated data (which can include, for example, a stored credit balance), eSE 120 can check not only that the signature of the associated data is valid, but also that the count value of replay counter 240 stored in the bundle of replay counters matches the current value of replay counter 240. If the two values match, the dedicated count value for that particular application stored in the bundle is valid and can be used by a merchant or the mobile device to prevent a replay attack. In one embodiment, a copy of the dedicated count value for that particular application can be stored with the associated data for that particular application in host non-volatile memory 110. A comparison of this stored copy with the verified count value for the particular application stored in the bundle can detect, and therefore prevent, a replay attack.

It should be noted that, although eSE 120 has been described above as not including (non-scalable) integrated, non-volatile memory for storing security-sensitive applications, in other embodiments eSE 120 can include such memory. It should be further noted that, although host non-volatile memory 110 can be used to store secure data 135, in general, any non-volatile memory external to eSE 120 can be used.

Figure 3:
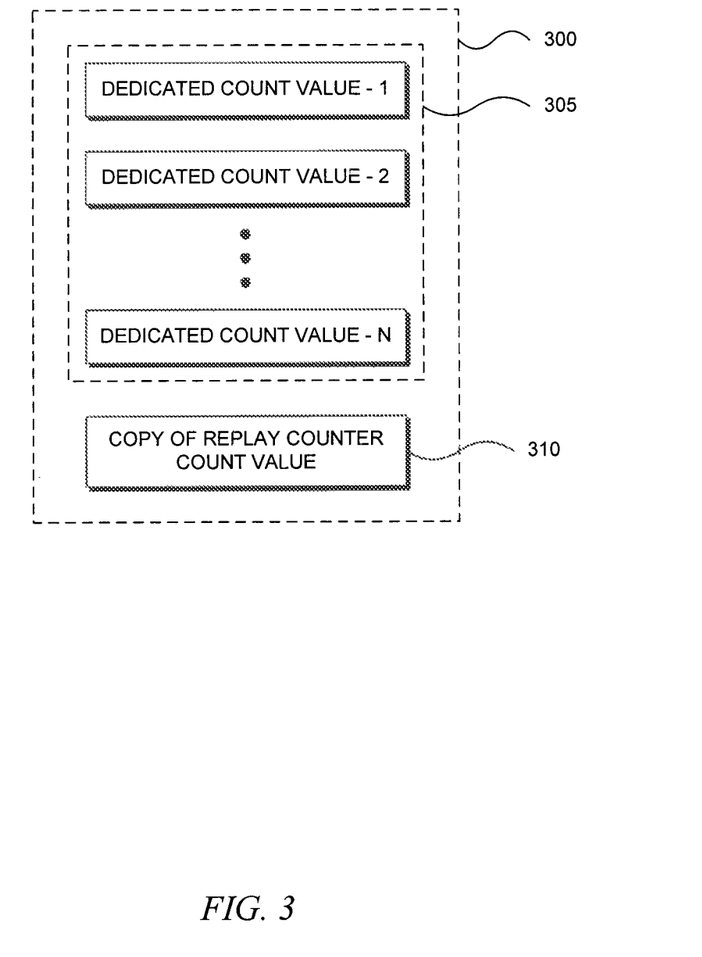
FIG. 3 illustrates an example bundle used to detect replay attacks, according to embodiments of the present invention.

FIG. 3 illustrates an example bundle 300 used to detect replay attacks, according to embodiments of the present invention. As illustrated in FIG. 3, bundle 300 includes N dedicated count values 305, each of which corresponds to a security-sensitive application and a copy 310 of the count value of replay counter 240 illustrated in FIG. 2. Bundle 300 can be encrypted, signed, and stored in host non-volatile memory 110 further illustrated in FIG. 2. In an embodiment, bundle 300 is encrypted, signed, and stored in host non-volatile memory 110 as a blob.

Figure 4:
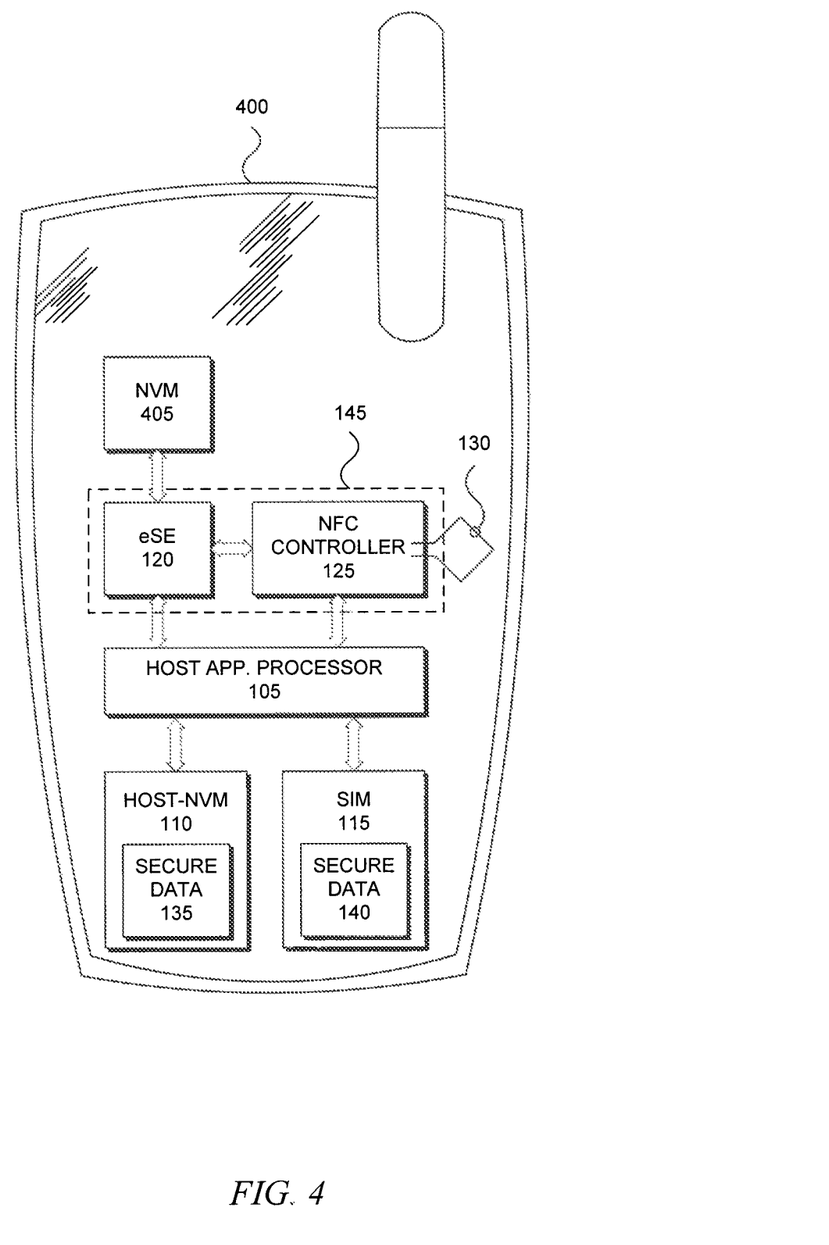
FIG. 4 illustrates a block diagram of a security architecture for securely storing NFC applications in host memory of a mobile device and in non-volatile memory directly coupled and external to an eSE, according to embodiments of the present invention.

Referring now to FIG. 4, a block diagram of a security architecture for securely storing applications and associated data in host memory of a mobile device 400 and in non-volatile memory directly coupled and external to an eSE is illustrated, according to embodiments of the present invention. The structure of mobile device 400 is similar to mobile device 100 illustrated in FIG. 1. However, mobile device 400 further includes an additional non-volatile memory 405 that is directly coupled to eSE 120.

Non-volatile memory 405 can include one or more of read-only memory (ROM), electrically erasable programmable ROM (EEPROM), and flash memory, to name a few. In an embodiment, non-volatile memory 405 is configured to store secure data, such as secure data 135, containing encrypted and signed security-sensitive applications and associated data. Because non-volatile memory 405 is directly coupled to eSE 120, encrypted and signed security-sensitive applications stored therein can potentially be accessed even when host application processor 105 is not active and/or powered.

Figure 5:
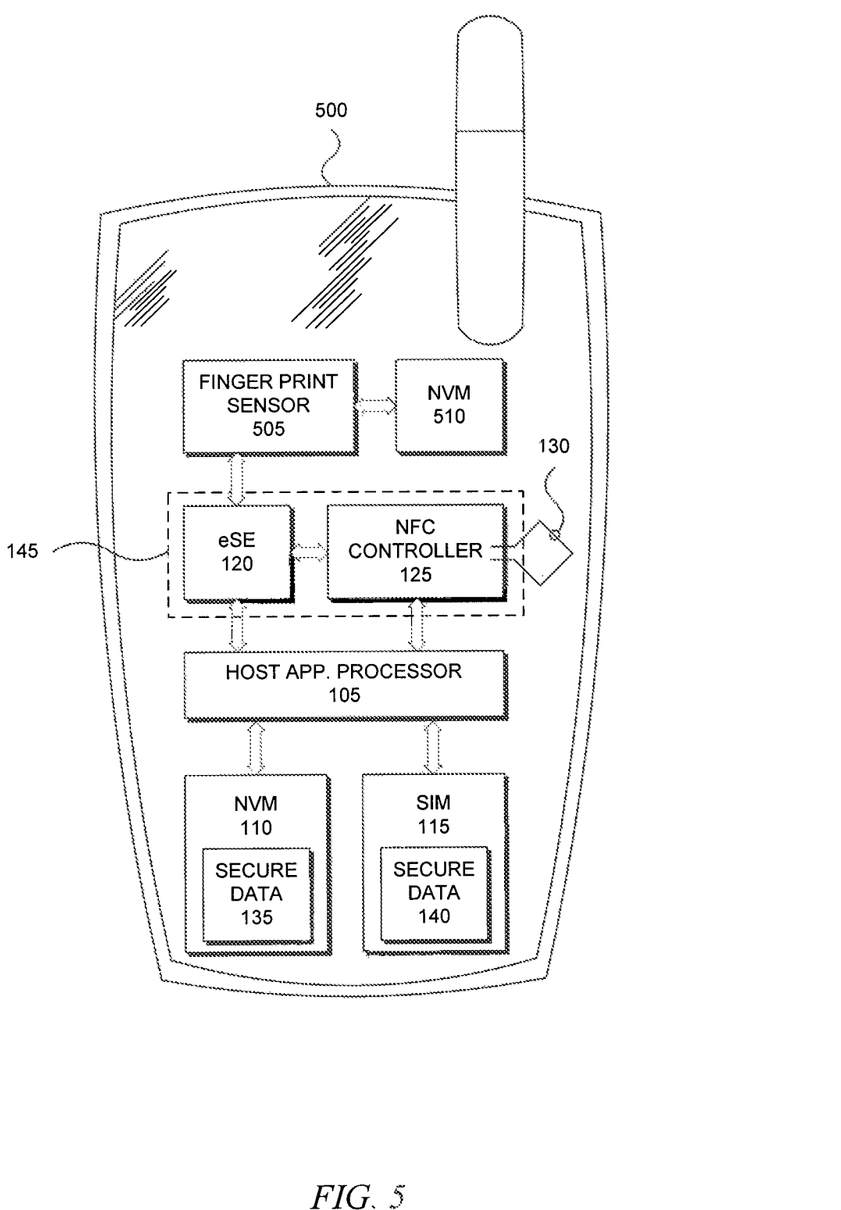
FIG. 5 illustrates a block diagram of a security architecture for securely storing NFC applications in host memory of a mobile device that further includes a fingerprint sensor directly coupled to an eSE, according to embodiments of the present invention.

Referring now to FIG. 5, a block diagram of a security architecture for securely storing applications and associated data in host memory of a mobile device 500 that further includes a fingerprint sensor directly coupled to an eSE is illustrated, according to embodiments of the present invention. The structure of mobile device 500 is similar to mobile device 100 illustrated in FIG. 1. However, mobile device 500 further includes a fingerprint sensor 505 that is directly coupled to eSE 120, as well as a non-volatile memory 510.

Fingerprint sensor 505 is configured to scan a finger. For example, fingerprint sensor 505 can be used to scan an attempted user of mobile device 500 to grant or deny access to the functionality of mobile device, or can be used to scan an individual's finger to support the functionality of an application executing on mobile device 500. Fingerprint templates corresponding to a valid user or individual can be stored in non-volatile memory 510. eSE 120 can use these templates to authenticate the user or individual if the fingerprint scanned by fingerprint sensor 505 matches one or more of the templates sored in non-volatile memory 510. In an embodiment, eSE 120 encrypts and signs the fingerprint templates before the templates are stored in non-volatile memory 510. Because fingerprint sensor 505 is directly coupled to eSE 120, fingerprint sensor 505 and eSE 120 can be used in combination to authenticate a user even when host application processor 105 is not active and/or powered.

Non-volatile memory 510 can include one or more of read-only memory (ROM), electrically erasable programmable ROM (EEPROM), and flash memory, to name a few. In an embodiment, non-volatile memory 510 is further directly coupled to eSE 120 and can be accessed even when host application processor 105 is not active and/or powered.

Figure 6:
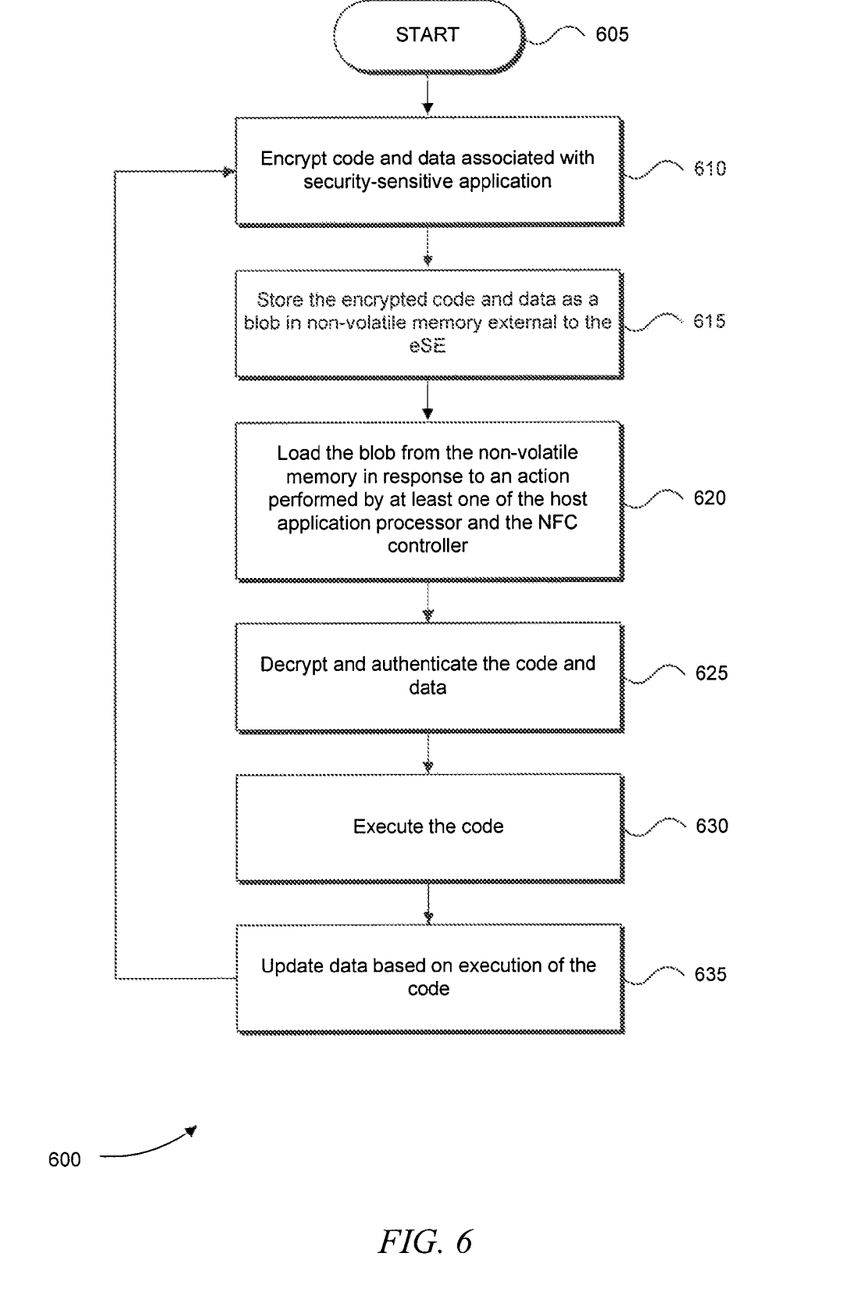
FIG. 6 illustrates a flowchart of a method for securely storing applications and associated data in host memory of a mobile device for execution by an eSE, according to embodiments of the present invention.

FIG. 6 illustrates a flowchart 600 of a method for securely storing applications and associated data in host memory of a mobile device for execution by an eSE, according to embodiments of the present invention. Flowchart 600 is described with continued reference to the exemplary operating environment depicted in FIG. 1. However, flowchart 600 is not limited to that embodiment. For example, flowchart 600 is equally applicable to the operating environments depicted in FIGS. 4 and 5.

Flowchart 600 starts at step 605 and transitions to step 610. In step 610, code and data associated with a security-sensitive application, such as a NFC application, is encrypted by eSE 120. The encrypted code and data can be further signed in addition to be encrypted by eSE 120.

In step 615, the encrypted code and data are stored in host non-volatile memory 110, which is external to the eSE, as a blob.

In step 620, the blob is loaded from host non-volatile memory 110 by eSE 120. The blob can be loaded in response to an action or request by at least one of host application processor 105 and NFC controller 125. Once loaded, the loaded blob can be stored in volatile memory of eSE 120.

In step 625, the code and data stored as the blob loaded from host non-volatile memory 110 is decrypted and, if signed, authenticated by eSE 120.

In step 630, the decrypted (and possibly authenticated) code and data is executed by eSE 120.

In step 635, the data associated with the security-sensitive application is updated by eSE 120 based on the execution of the code. For example, the data can be updated based on an exchange of information with a remote NFC-enabled device that occurs upon execution of the code.

After step 635, flowchart 600 returns to step 610 and the code and updated data of the security-sensitive application can be again encrypted and stored in host non-volatile memory 110 by eSE 120.

Figure 7:
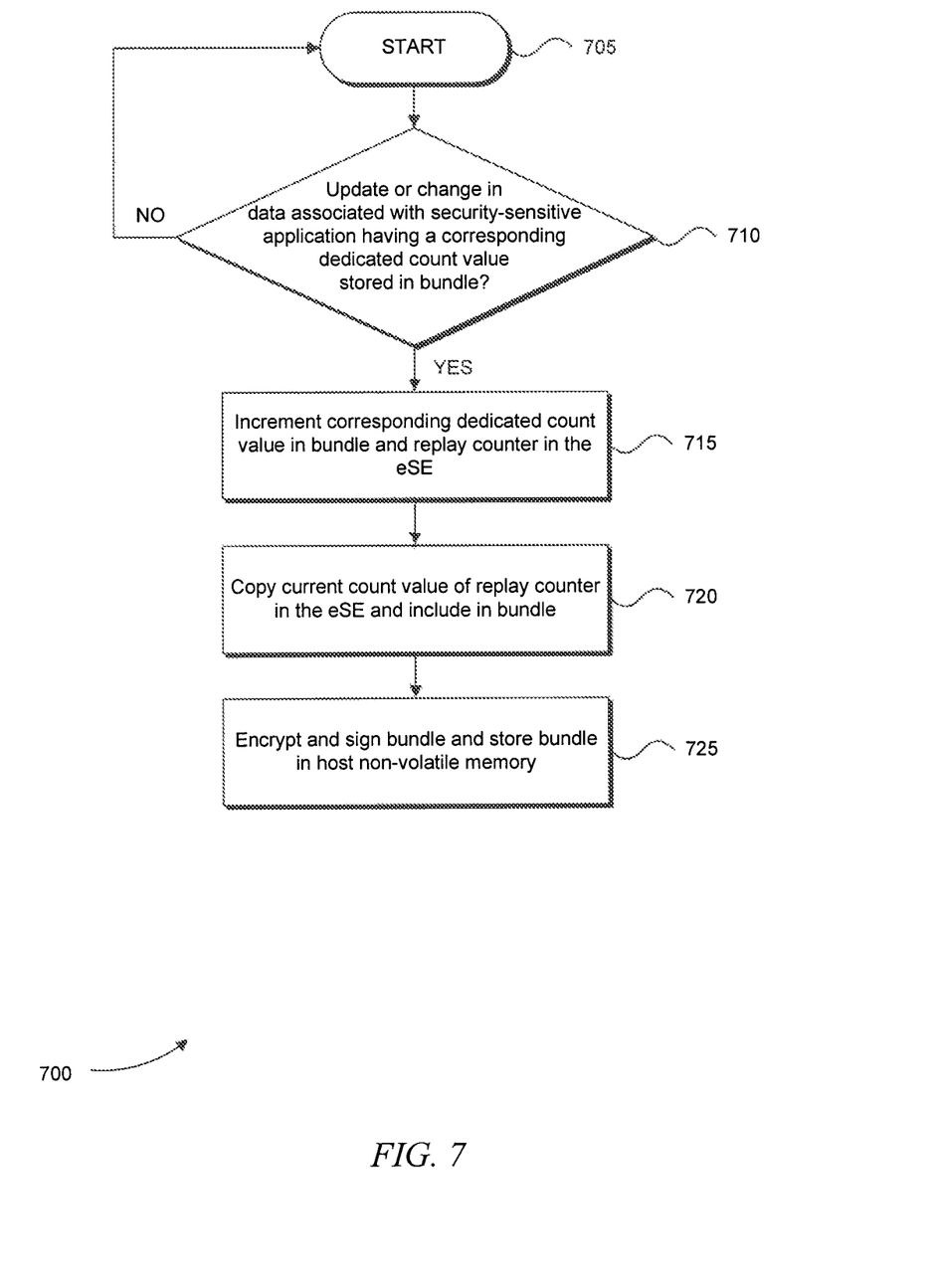
FIG. 7 illustrates a flowchart of a method for updating a bundle of dedicated count values that correspond to security-sensitive applications and for securely storing the bundle in host memory of a mobile device, according to embodiments of the present invention.

FIG. 7 illustrates a flowchart 700 of a method for updating a bundle of dedicated count values that correspond to security-sensitive applications and for securely storing the bundle in host non-volatile memory of a mobile device, according to embodiments of the present invention. The bundle of dedicated count values can be used to prevent replay attacks. Flowchart 700 is described with continued reference to the exemplary operating environments depicted in FIGS. 1 and 2. However, flowchart 700 is not limited to those embodiments. For example, flowchart 700 is equally applicable to the operating environments depicted in FIGS. 4 and 5.

Flowchart 700 starts at step 705 and transitions to step 710. In step 710, a determination is made by eSE 120 as to whether an update or change in data associated with a security-sensitive application having a corresponding dedicated count value stored in the bundle has been made. If no update or change has been made, flowchart 700 can transition back to step 705, and the method of flowchart 700 can begin again. If an update or change has been made, flowchart 700 transitions to step 715.

In step 715, the dedicated count value of the security-sensitive application that had an update or change to its associated data is incremented and the replay counter 240 is incremented.

In step 720, a copy of the current count value of replay counter 240 is included in the bundle. The copy can replace a previous copy of the count value of replay counter 240 stored in the bundle.

In step 725, the bundle is encrypted and signed and stored in host non-volatile memory 110.

Figure 8:
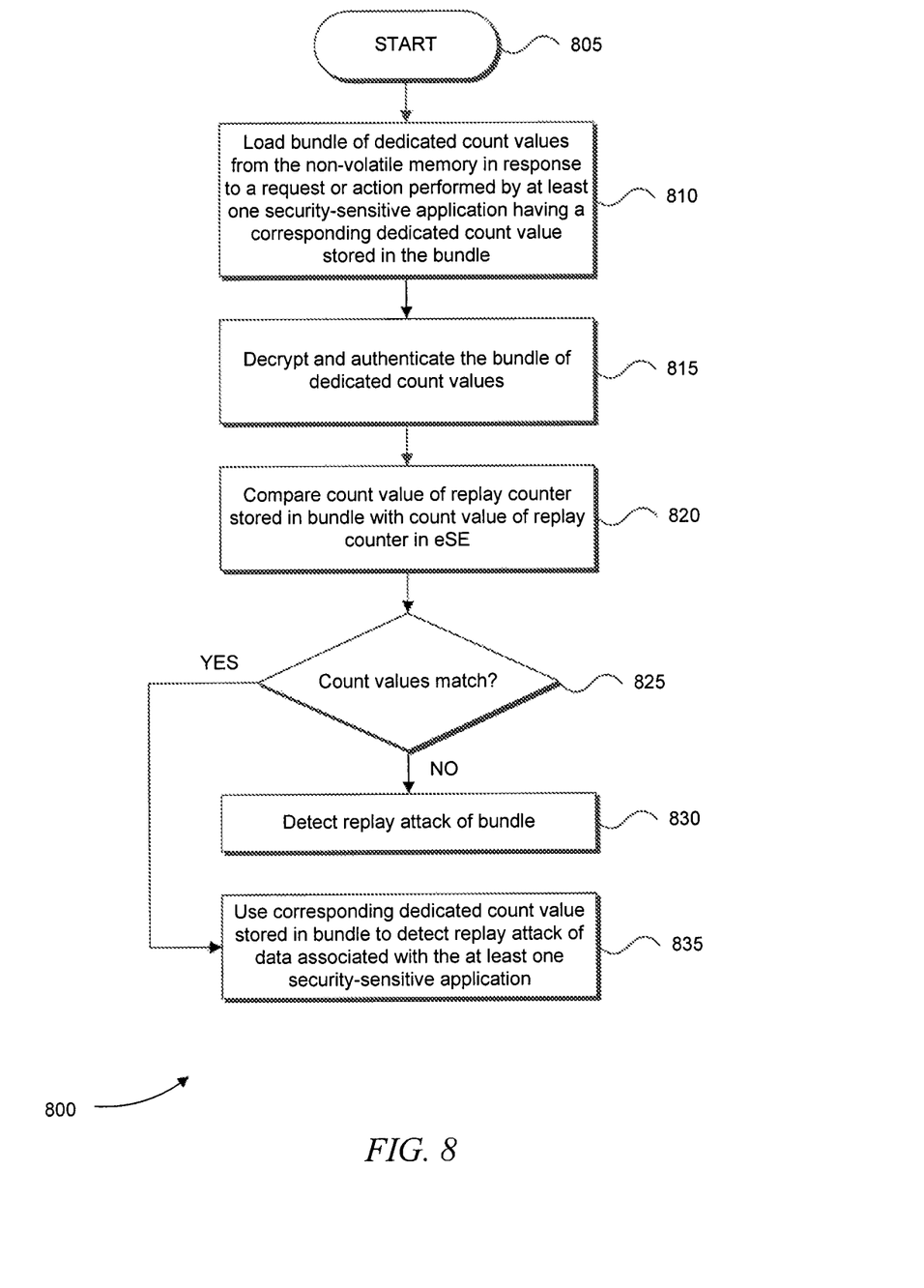
FIG. 8 illustrates a flowchart of a method for detecting a replay attack using a bundle of dedicated count values, securely stored in host memory of a mobile device, that correspond to security-sensitive applications, according to embodiments of the present invention.

FIG. 8 illustrates a flowchart 800 of a method for detecting a replay attack using a bundle of dedicated count values, securely stored in host non-volatile memory of a mobile device, that correspond to security-sensitive applications, according to embodiments of the present invention. Flowchart 800 is described with continued reference to the exemplary operating environments depicted in FIGS. 1 and 2. However, flowchart 800 is not limited to those embodiments. For example, flowchart 800 is equally applicable to the operating environments depicted in FIGS. 4 and 5.

Flowchart 800 starts at step 805 and transitions to step 810. In step 810, the bundle of dedicated count values is loaded from host non-volatile memory 110 by eSE 120 in response to, for example, a request or action performed by at least one security-sensitive application having a corresponding dedicated count value stored in the bundle.

In step 815, eSE 120 decrypts and authenticates the bundle of dedicated count values. Authentication can be performed using a cryptographic hash.

In step 820, the copy of the count value of replay counter 240, stored in the bundle, is compared to the current count value retained by replay counter 240.

In step 825, a determination is made by eSE 120 as to whether the two count values compared in step 820 match. If the two count values do not match, flowchart 800 transitions to step 820 and a replay attack involving the stored bundle is detected. If the two count values do match, flowchart 800 transitions to step 835.

In step 835, the dedicated count value for that particular application stored in the bundle can be considered valid and used, for example, by a merchant or the mobile device to detect a replay attack. In one embodiment, a copy of the dedicated count value for that particular application can be stored with the associated data for that particular application in host non-volatile memory 110. A comparison of this stored copy with the verified count value for the particular application stored in the bundle can detect, and therefore prevent, a replay attack.

It will be appreciated that the above described embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for using an embedded Secure Element (eSE) of a mobile device to execute a Near Field Communication (NFC) application stored in a non-volatile memory external to the eSE, the method comprising:

loading code and state data associated with the NFC application from the non-volatile memory into the eSE;

authenticating the code and the state data loaded from the non-volatile memory;

after authenticating the code and the state data, executing the code in the eSE to exchange data with a contactless communication device using a NFC controller;

incrementing a dedicated count value corresponding to the NFC application in response to the state data being updated based on the data exchanged with the contactless communication device; and maintaining the dedicated count value in a bundle of dedicated count values protected by a replay counter in the eSE.

2. The method of claim 1, wherein the code and the state data are stored in encrypted form in the non-volatile memory.

3. The method of claim 1, wherein the code and the state data are decrypted before being authenticated.

4. The method of claim 1, wherein the non-volatile memory is accessible to the eSE through a host application processor of the mobile device.

5. The method of claim 1, further comprising:
encrypting the updated state data and storing the encrypted, updated state data in the non-volatile memory.

6. The method of claim 1, further comprising:
incrementing the replay counter in the eSE in response to one of the dedicated count values in the bundle of dedicated count values being incremented.

7. The method of claim 6, further comprising:
detecting a replay attack involving the bundle of dedicated count values using the replay counter in the eSE.

8. The method of claim 1, wherein the NFC application is a payment application, a loyalty application, or a ticketing application.

9. A mobile device, comprising:
an embedded Secure Element (eSE); and
a non-volatile memory external to the eSE,
wherein the eSE is configured to
load code and state data associated with an application from the non-volatile memory;
authenticate the code and the state data loaded from the non-volatile memory;
execute the code to exchange data with a contactless communication device using a Near Field Communication (NFC) controller;
increment a dedicated count value associated with the application in response to the state data being updated based on the data exchanged with the contactless communication device; and
maintain the dedicated count value in a bundle of dedicated count values protected by a replay counter in the eSE.

10. The mobile device of claim 9, wherein the code and the state data are stored in encrypted form in the non-volatile memory.

11. The mobile device of claim 9, wherein the code and the state data are decrypted before being authenticated.

12. The mobile device of claim 9, wherein the non-volatile memory is accessible to the eSE through a host application processor of the mobile device.

13. The mobile device of claim 9, wherein the eSE is further configured to encrypt the updated state data and store the encrypted, updated state data in the non-volatile memory.

14. The mobile device of claim 9, wherein the eSE is configured to increment the replay counter in the eSE in response to one of the dedicated count values in the bundle of dedicated count values being incremented.

15. The mobile device of claim 14, wherein the eSE is configured to detect a replay attack involving the bundle of dedicated count values using the replay counter in the eSE.

16. The mobile device of claim 9, wherein the code is associated with a payment application, a loyalty application, or a ticketing application.

17. A method for securely storing and executing code and state data, the method comprising:
authenticating the code and the state data after the code and the state data is loaded into an embedded Secure Element (eSE) of a mobile device from a non-volatile memory;
after authenticating the code and the state, executing the code to exchange data with a contactless communication device;
incrementing a dedicated count value in response to the state data being updated based on the data exchanged with the contactless communication device; and
maintaining the dedicated count value in a bundle of dedicated count values protected by a replay counter in the eSE.

18. The method of claim 17, further comprising:
incrementing the replay counter in the eSE in response to one of the dedicated count values in the bundle of dedicated count values being incremented.

19. The method of claim 18, further comprising:
detecting a replay attack involving the bundle of dedicated count values using the replay counter in the eSE.

* * * * *